United States Patent
Kuo et al.

(10) Patent No.: US 12,041,651 B2
(45) Date of Patent: Jul. 16, 2024

(54) LOGICAL CHANNEL PRIORITIZATION

(71) Applicant: Nokia Technologies Oy, Espoo (FI)

(72) Inventors: Ping-Heng Kuo, Bristol (GB); Chunli Wu, Beijing (CN); Samuli Turtinen, Ii (FI); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 345 days.

(21) Appl. No.: 17/598,560

(22) PCT Filed: Mar. 28, 2019

(86) PCT No.: PCT/CN2019/080132
§ 371 (c)(1),
(2) Date: Sep. 27, 2021

(87) PCT Pub. No.: WO2020/191720
PCT Pub. Date: Oct. 1, 2020

(65) Prior Publication Data
US 2022/0174687 A1    Jun. 2, 2022

(51) Int. Cl.
*H04W 72/566* (2023.01)
*H04W 72/23* (2023.01)
*H04W 72/50* (2023.01)

(52) U.S. Cl.
CPC ......... *H04W 72/569* (2023.01); *H04W 72/23* (2023.01); *H04W 72/535* (2023.01)

(58) Field of Classification Search
CPC .. H04W 72/21; H04W 72/569; H04W 72/535
See application file for complete search history.

(56) References Cited

U.S. PATENT DOCUMENTS

| 2016/0330752 A1 | 11/2016 | Kato et al. |
| 2017/0086168 A1 | 3/2017 | Takahashi et al. |

(Continued)

FOREIGN PATENT DOCUMENTS

| EP | 3 281 476 A | 2/2018 |
| WO | WO 2016/163660 A1 | 10/2016 |
| WO | WO-2019/029432 A1 | 2/2019 |

OTHER PUBLICATIONS

3GPP TSG-RAN WG1 #96, Athens, Greece, Feb. 25-Mar. 1, 2019, R1-1903766, "Summary of Thursday offline discussion on UL/DL intra-UE prioritization/multiplexing", Nokia, Nokia Shanghai Bell, 29 pgs.

(Continued)

*Primary Examiner* — Kevin Kim
(74) *Attorney, Agent, or Firm* — Lippes Mathias LLP

(57) ABSTRACT

Example embodiments of the present disclosure relate to logical channel prioritization. A method includes obtaining an uplink grant from a network device, the uplink grant indicating uplink resources for transmission to the network device and selecting a logical channel prioritization setting from a plurality of logical channel prioritization settings based on a predetermined policy related to the uplink grant, the logical channel prioritization settings defining different sets of prioritization parameters for uplink data in at least one logical channel and uplink control information in occupying the uplink resources. The method further includes generating, based on the logical channel prioritization setting, a packet data unit including at least one of the uplink control information or at least one part of the uplink data for transmission to the network device using the uplink resources. In this way, adaptive and dynamic prioritization across logical channels can be achieved at the terminal device.

13 Claims, 5 Drawing Sheets

(56) References Cited

U.S. PATENT DOCUMENTS

| | | |
|---|---|---|
| 2017/0118766 A1 | 4/2017 | Baek et al. |
| 2018/0063300 A1 | 3/2018 | Chiu |
| 2018/0270839 A1 | 9/2018 | Loehr et al. ............... 72/10 |
| 2018/0324835 A1* | 11/2018 | Agiwal ............... H04W 72/569 |
| 2020/0037345 A1* | 1/2020 | Ryoo ................... H04W 76/27 |

OTHER PUBLICATIONS

3GPP TSG-RAN WG1 #96, Athens, Greece, Feb. 25-Mar. 1, 2019, R1-1903818, "Summary of Friday offline discussion on UL/DL intra-UE prioritization/multiplexing", Nokia, Nokia Shanghai Bell, 29 pgs.

* cited by examiner

LOGICAL CHANNEL PRIORITIZATION

CROSS REFERENCE TO RELATED APPLICATION

This patent application is a U.S. National Stage application of International Patent Application Number PCT/CN2019/080132 filed Mar. 28, 2019, which is hereby incorporated by reference in its entirety.

FIELD

Example embodiments of the present disclosure generally relate to the field of telecommunication and in particular, to logical channel prioritization.

BACKGROUND

Various wireless cellular communication systems have been implemented and are being implemented. Mobile communication systems have been developed and are being developed to meet the increasing demand for communication services. With the rapid advance of technologies, the mobile communication systems have evolved to the level capable of providing high speed data communication service beyond the early voice-oriented services.

In the communication systems, a terminal device communicates uplink (UL) information with a network device using an UL grant provided by the network device. The UL information includes UL data and/or UL control information. The UL grant generally indicates UL resources available for use by the terminal device. The terminal device can apply logical channel prioritization (LCP) across one or more logical channels (LCHs) having data to be transmitted, allocating the UL resources for transmission of the UL data and/or possible UL control information.

SUMMARY

In general, example embodiments of the present disclosure provide a solution for logical channel prioritization.

In a first aspect, there is provided a method. The method comprises obtaining, at a terminal device, an uplink grant from a network device, the uplink grant indicating uplink resources for transmission to the network device; selecting a logical channel prioritization setting from a plurality of logical channel prioritization settings based on a predetermined policy related to the uplink grant, the plurality of logical channel prioritization settings defining different sets of prioritization parameters for uplink data in at least one logical channel and uplink control information in occupying the uplink resources; and generating, based on the selected logical channel prioritization setting, a packet data unit comprising at least one of the uplink control information or at least one part of the uplink data for transmission to the network device using the uplink resources.

In a second aspect, there is provided a method. The method comprises assigning, by a network device, an uplink grant to a terminal device, the uplink grant indicating uplink resources for transmission to the network device; transmitting, to the terminal device, a setting indication that one of the plurality of logical channel prioritization settings is to be applied for the uplink grant, the plurality of logical channel prioritization settings defining different sets of prioritization parameters for uplink data in at least one logical channel and uplink control information in occupying the uplink resources; and receiving a packet data unit from the terminal device on the uplink resources, the packet data unit comprising at least one of the uplink control information or at least one part of the data, and the packet data unit being generated based on the logical channel prioritization setting indicated by the setting indication.

In a third aspect, there is provided a device. The device comprises at least one processor; and at least one memory including computer program codes; the at least one memory and the computer program codes are configured to, with the at least one processor, cause the device to obtain, at a terminal device, an uplink grant from a network device, the uplink grant indicating uplink resources for transmission to the network device; select a logical channel prioritization setting from a plurality of logical channel prioritization settings based on a predetermined policy related to the uplink grant, the plurality of logical channel prioritization settings defining different sets of prioritization parameters for uplink data in at least one logical channel and uplink control information in occupying the uplink resources; and generate, based on the selected logical channel prioritization setting, a packet data unit comprising at least one of the uplink control information or at least one part of the uplink data for transmission to the network device using the uplink resources.

In a fourth aspect, there is provided a device. The device comprises at least one processor; and at least one memory including computer program codes; the at least one memory and the computer program codes are configured to, with the at least one processor, cause the device to assign, by a network device, an uplink grant to a terminal device, the uplink grant indicating uplink resources for transmission to the network device, transmit, to the terminal device, a setting indication that one of the plurality of logical channel prioritization settings is to be applied for the uplink grant, the plurality of logical channel prioritization settings defining different sets of prioritization parameters for uplink data in at least one logical channel and uplink control information in occupying the uplink resources; and receive a packet data unit from the terminal device on the uplink resources, the packet data unit comprising at least one of the uplink control information or at least one part of the data, and the packet data unit being generated based on the logical channel prioritization setting indicated by the setting indication.

In a fifth aspect, there is provided an apparatus comprising means for obtaining, at a terminal device, an uplink grant from a network device, the uplink grant indicating uplink resources for transmission to the network device; means for selecting a logical channel prioritization setting from a plurality of logical channel prioritization settings based on a predetermined policy related to the uplink grant, the plurality of logical channel prioritization settings defining different sets of prioritization parameters for uplink data in at least one logical channel and uplink control information in occupying the uplink resources; and means for generating, based on the selected logical channel prioritization setting, a packet data unit comprising at least one of the uplink control information or at least one part of the uplink data for transmission to the network device using the uplink resources.

In a sixth aspect, there is provided an apparatus comprising means for assigning, by a network device, an uplink grant to a terminal device, the uplink grant indicating uplink resources for transmission to the network device; means for transmitting, to the terminal device, a setting indication that one of the plurality of logical channel prioritization settings is to be applied for the uplink grant, the plurality of logical channel prioritization settings defining different sets of prioritization parameters for uplink data in at least one logical channel and uplink control information in occupying the uplink resources; and means for receiving a packet data unit from the terminal device on the uplink resources, the packet data unit comprising at least one of the uplink control information or at least one part of the data, and the packet data unit being generated based on the logical channel prioritization setting indicated by the setting indication.

In a seventh aspect, there is provided a non-transitory computer readable medium comprising program instructions for causing an apparatus to perform at least the method according to the above first aspect.

In an eighth aspect, there is provided a non-transitory computer readable medium comprising program instructions for causing an apparatus to perform at least the method according to the above second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
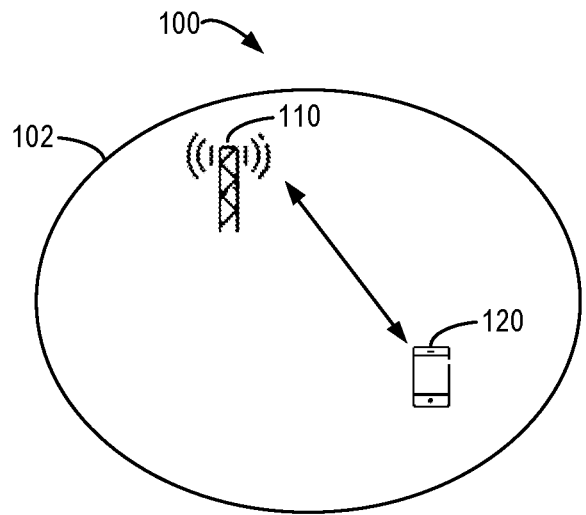
FIG. 1 illustrates an example communication network in which example embodiments of the present disclosure may be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an example embodiment," "an example embodiment," and the like indicate that the example embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other example embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular example embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Example embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 illustrates an example communication system 100 in which example embodiments of the present disclosure may be implemented. The system 100 includes a network device 110 and a terminal device 120 served by the network device 110. The serving area of the network device 110 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the network device 110.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Cyclic Prefix Orthogonal Frequency Division Multiplexing (CP-OFDM), Discrete Fourier Transform spread OFDM (DFT-s-OFDM) and/or any other technologies currently known or to be developed in the future.

In the communication system 100, the network device 110 can communicate data and control information to the terminal device 120 and the terminal device 120 can also communicate data and control information to the network device 110. A link from the network device 110 to the terminal device 120 is referred to as a downlink (DL), while a link from the terminal device 120 to the network device 110 is referred to as an uplink (UL). In DL, the network device 110 is a transmitting (TX) device (or a transmitter) and the terminal device 120 is a receiving (RX) device (or a receiver). In UL, the terminal device 120 is a TX device (or a transmitter) and the network device 110 is a RX device (or a receiver).

During operation, the terminal device 120 may receive from the network device 110 an UL grant indicating UL resources for the UL communication. The terminal device 120 may be capable of providing multiple different services to a user. Examples of the services may include but are not limited to, voice communications, text messages, email access, network access to remote networks such as the Internet, and file transfers to/from remote computers. The terminal device 120 may have a plurality of logical channels (LCHs) each associated with one or more applications or services of the terminal device 120 for data transmission. Data from one or more LCHs may be multiplexed in a packet data unit (PDU), such as a Medium Access Control (MAC) PDU, to be transmitted to the network device 110.

The terminal device 120 may perform logical channel prioritization (LCP) at a MAC layer to construct the PDU for transmission. The LCP is required to make sure that the UE serves the LCHs in a certain sequence. As such, the LCHs with higher priorities can be served first in the case that the UL resources are not sufficient for UL data in all the active LCHs. In some cases, if there is UL control information to be transmitted, the terminal device 120 may also include the UL control information into the PDU, for example, as one or more MAC control elements (CEs).

In conventional LCP, the priority levels and other prioritization parameters for the LCHs are preconfigured and fixed at a terminal device. The terminal device may always follow the preconfigured priority levels and other prioritization parameters when performing the LCP for each of the received UL grants. In some cases, if certain UL control information such as buffer status report (BSR) or power headroom report (PHR), is triggered for transmission, the terminal device will first map the UL control information into a transport block (TB) associated with the UL grant, followed by mapping of data from one or more LCHs in accordance to their configured priority levels and other parameters such as prioritized bit rates (PBR).

Although the fixed LCP may be configured to ensure that different types of data are transmitted in an appropriate manner according to their requirements, at the same time such framework may lead to less flexible operation. Additionally, there are some configurable LCP mapping restrictions that may be applied to a LCH. For example, some LCP mapping restrictions may indicate allowed numerology, allowed serving cells, and/or an allowed type of UL grant, and/or the maximum duration. According to the LCP mapping restrictions, the terminal device may forbid mapping of a LCH to an UL grant if the UL grant does not satisfy the LCP mapping restriction(s) applied to this LCH. The LCP mapping restrictions is adopted to facilitate meeting quality of service (QoS) requirements of certain traffic. However, the fixed LCP mechanism may adversely affect the performance of certain traffic when applying the LCP mapping restrictions.

Therefore, improvements and enhancements are desired to make LCP more flexible. According to example embodiments of the present disclosure, there is providing a solution for grant-based LCP. In this solution, a terminal device is configured with a plurality of different LCP settings. For each UL grant, the terminal device selects one of the different LCP settings for the UL grant and generates, based on the selected LCP setting, a PDU comprising UL control information and/or at least part of UL data in a plurality of LCHs for UL transmission. In this way, adaptive and dynamic LCP across LCHs can be achieved at the terminal device.

Figure 2:
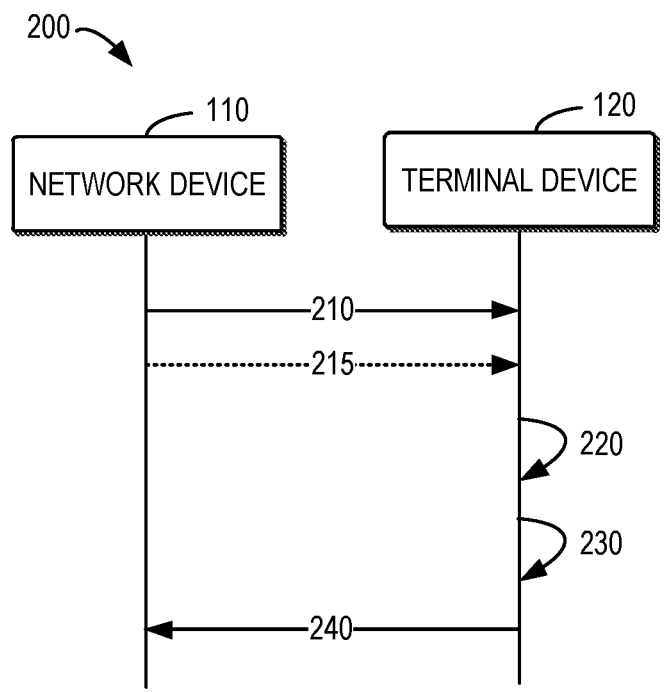
FIG. 2 illustrates a flowchart illustrating logical channel prioritization according to some example embodiments of the present disclosure.

Principle and example embodiments of the present disclosure will be described in detail below with reference to the accompanying drawings. Reference is now made to FIG. 2, which shows a process 200 for LCP according to an example embodiment of the present disclosure. For the purpose of discussion, the process 200 will be described with reference to FIG. 1. The process 200 may involve the terminal device 120 and the network device 110 as illustrated in FIG. 1.

In the process 200, the network device 110 assigns 210 an UL grant to the terminal device 120. An UL grant may be scheduled to the terminal device 120 in a dynamic manner, a semi-persistent/configured manner, or the like, and may indicate corresponding UL resources for UL transmission to the network device 110. The granted UL resources may include resources for UL transmission mapped on a physical uplink shared channel (PUSCH) and/or other physical channels. Examples of the UL grant may include a dynamic UL grant, a configured grant, or other grants. Based on the UL grant, the UE may identify in which UL resource(s) it is scheduled for UL transmission. The UL grant may also indicate one or more parameters for transmission using the corresponding UL resources.

Upon obtaining the UL grant from the network device 110, the terminal device 120 selects 220 a LCP setting for the UL grant from a plurality of LCP settings based on a predetermined policy related to the UL grant. In example embodiments of the present disclosure, the terminal device 120 is configured with more than one LCP setting and is capable of dynamically selecting a LCP setting for use depending on the UL grant. The plurality of LCP settings define different sets of prioritization parameters for UL data in one or more LCHs and UL control information in occupying the UL resources. In some examples, a plurality of LCP settings may define the prioritization parameters for a subset of LCHs established at the terminal device 120, and a plurality of further LCP settings may define prioritization parameters for a further subset of LCHs established at the terminal device 120. According to the LCP setting, the terminal device 120 may allocate the UL resources for transmission of part or all of the UL data in the LCH(s) and/or the UL control information.

As used herein, UL data in a LCH may include UL traffic corresponding to the service or application associated with the LCH. UL control information may indicate any type of control information that is to be transmitted in UL. In an example embodiment, the UL control information may include a Buffer Status Report (BSR) and/or a Power Headroom Report (PHR). BSR indicates respective amounts of UL data to be transmitted on different LCHs, or a total amount of UL data to be transmitted on a group of LCHs or all the LCHs. PHR is used to inform the network device 110 of power situation of the terminal device 120 so that the network device 110 can decide whether to allocate more resources to the terminal device 120 or not. Other examples of UL control information may include, for instance, Configured Grant Confirmation, and/or Recommended Bit Rate information. Some of the UL control information may be specific or related to one or more LCHs, such as BSR for individual LCHs or a group of LCHs. Some of the UL control information may not be related to a specific LCH, such as the PHR for the whole terminal device 120.

The UL resources granted by the UL grant may be available for transmitting a certain size of UL information, such as a certain size of transport block (TB). The set of prioritization parameters may be used by the terminal device 120 to determine UL data in which LCHs can occupy the UL resources, how the UL data can occupy the UL resources, and the amount of data that can be transmitted using the UL resources. The prioritization parameters may also be related to the UL control information. The prioritization parameters may include any parameters that could affect prioritization of UL data in the LCHs and the possible UL control information in UL transmission with the UL grant. To better understand the example embodiments of the present disclosure, some examples of the prioritization parameters will be first introduced below.

In an example embodiment, a LCP setting may define relative prioritization between the UL control information and the UL data in the one or more LCHs as a prioritization parameter. This prioritization parameter indicates whether the UL control information can be prioritized UL data in one, some or all of the LCHs or according to the corresponding LCP setting. For example, if the UL control information is prioritized UL data in the LCHs, UL resources granted by the UL grant may be first allocated to carry the UL control information, and the remaining UL resources may than be allocated for UL data in the LCHs. In the cases where UL data in one or more LCHs are prioritized the UL control information, the transmission of the UL data may be first considered in allocation of the UL resources.

The LCP setting may also define respective priority levels of the one or more LCHs as the prioritization parameters. As used herein, a priority level of a LCH indicates a priority of UL data from the LCH. The respective priority levels indicate the order of LCHs and the terminal device 120 may allocate the UL resources for transmission of UL data in the LCHs according to the order. In some examples, LCHs may be given a priority level from 1 to 16, with a priority level of 1 being the highest priority, and a priority level of 16 being the lowest priority. The higher the priority level, the higher the possibility that UL data in the corresponding LCH can be transmitted using the granted UL resources.

The LCP setting may alternatively or in addition define respective prioritized bit rates (PBR) and/or respective bucket size durations (BSD) for the one or more LCHs as prioritization parameters. The PBR provides a "guaranteed" bit rate that should be achieved for the corresponding LCH provided that the network device assigns sufficient UL resources. The PBR, in some examples, may be set to 8, 16, 32, 64, 128, 256, or 512 kbps. The BSD is used for resource allocation during LCP performed by the terminal device. The PBR and/or BSD may be used to determine an amount of UL data in a corresponding LCH to be transmitted using the granted UL resources. In some examples, the terminal device 120 may maintain a variable Bj for each LCH j. The variable Bj may be initialized to zero when the related LCH is established and incremented by the product PBR×TTI duration for each TTI, where PBR is the Prioritized Bit Rate of LCH j. The value of Bj cannot exceed the bucket size and if the value of Bj is larger than the bucket size of LCH j, it may be set to the bucket size. The bucket size of a LCH is equal to PBR×BSD. It would be appreciated that in some examples, only one of PBR and BSD is set in the LCP setting, and the other one may be preconfigured as fixed values.

The set of prioritization parameters defined by a LCP setting may alternatively or additionally include one or more LCH mapping restrictions on at least one LCH for the current UL grant. A LCP mapping restriction may indicate whether UL data in a LCH can be mapped to or transmitted with a UL grant. In some examples, the LCP mapping restriction may indicate allowed numerology for a specific LCH (represented as "allowedSCS-List"). Numerology may be used to define a subcarrier spacing (SCS). The LCP mapping restriction of allowedSCS-List, if present, indicates that UL data in this LCH can only be mapped to the UL grant with the indicated allowed numerology. Another example of LCP mapping restriction may indicate whether allowed serving cells for a specific LCH (represented as "allowed-ServingCells"), which, if present, indicates that UL data in this LCH can only be mapped to the allowed serving cells. The restriction of the serving cells is typically used for PDCP duplication to ensure that the duplicated packets are transmitted on a different cell than that of the original packet.

The LCP mapping restriction may alternatively or additionally include a restriction of the allowed type of UL grant for a specific LCH, which, if present, indicates that UL data in this LCH can only be transmitted using the configured type of UL grant. For example, a LCH may be restricted to have UL grant Type 1 as the allowed UL grant. In a further example, the LCP mapping restriction may indicate a maximum duration for a specific LCH. According to this LCP mapping restriction, UL data in this LCH can only be transmitted with an UL grant that results in a duration shorter than or equal to the indicated maximum duration. This LCP mapping restriction can be set for a LCH with a low latency requirement, such as a LCH for Ultra-Reliable Low & Latency Communication (URLLC) data. It would be appreciated that other LCP mapping restrictions may also be included in a LCP setting as prioritization parameters for the LCHs. It would also be appreciated that the URLLC data is used as an example of UL data having a low latency requirement and/or a high reliability requirement in some example embodiments of the present disclosure, and other types of UL data with similar requirements are also applicable in those embodiments.

Some examples of the prioritization parameters defined in a LCP setting have been described above. It would be appreciated that one or more types of the prioritization parameters may be included in a LCP setting, and one or more of the prioritization parameters may be different among the plurality of LCP settings selectable at the terminal device 120. For example, if two LCP settings define prioritization parameters for UL data in one LCH and UL control information, the relative prioritization between the UL data and the UL control information, and/or the PBR, BSD, and/or the LCP mapping restriction for that LCH may be different in the two LCP settings. It would also be appreciated that any other prioritization parameters may also be included in the LCP settings as long as the parameter may determine the prioritization of UL data and UL control information in occupying the granted UL resources.

In some example embodiments described below, for convenience of discussion, relative prioritization between UL control information and UL data, priority levels, and/or PBRs for the LCHs are used as examples of the prioritization parameters. An example of two LCP settings with different prioritization parameters are provided below.

TABLE 1

An example of LCP settings

| Logical Channel | First LCP Setting | Second LCP Setting |
|---|---|---|
| UL control information (e.g. BSR, PHR) | Prioritize LCH 1, LCH 2, and LCH 3 | LCH 1, LCH 2, and LCH 3 prioritize UL control information |
| LCH 1 | Priority level: 1<br>PBR: 256 kbps | Priority level: 3<br>PBR: 128 kbps |
| LCH 2 | Priority level: 2<br>PBR: 512 kbps | Priority level: 1<br>PBR: 512 kbps |
| LCH 3 | Priority level: 3<br>PBR: 128 kbps | Priority level: 2<br>PBR: 256 kbps |

It would be appreciated that Table 1 is merely provided as a specific example without any limitation. More than two LCP settings may be configured at the terminal device 120, and each of the LCP setting may define more, less, or different prioritization parameters. In some other examples, a LCP setting may define prioritization parameters for one LCH.

The LCP settings have been discussed above. In example embodiments of the present disclosure, the terminal device 120 is configured with the plurality of LCP settings by the network device 110. For example, the network device 110 may transmit a configuration of the plurality of LCP settings to the terminal device 120. The configuration of the plurality of LCP settings may be provided, for example, via upper layer signaling such as radio resource control (RRC) signaling.

In example embodiments of the present disclosure, the terminal device 120 can dynamically switch amongst the plurality of LCP settings for each UL grant by following a predetermined policy related to the UL grant. In this way, it is possible to achieve grant-dependent prioritization for multiple UL grants, which offers more flexibility than performing the same prioritization for all the UL grants. In some example embodiments, the predetermined policy may allow the terminal device to autonomously determine the LCP setting selected for use based on at least one or more characteristics of the UL grant. In some example embodiments, the predetermined policy may allow the terminal device 120 to determine the LCP setting that is directly instructed by the network device 110 via a per-grant setting indication. In either way, the LCP setting employed at the terminal device 120 can be adapted according to the UL grant. Some example embodiments of the selection of the LCP setting will be described in detail below.

The terminal device 120 can perform prioritization across the one or more LCHs and/or the possible UL control information based on the selected LCP setting. Specifically, in the process 200 of FIG. 2, the terminal device 120 generates 230, based on the selected LCP setting, a PDU comprising at least one of the UL control information or at least one part of the UL data for transmission to the network device using the UL resources.

In some example embodiments, the terminal device 120 generates a MAC PDU at its MAC layer. In an example embodiment, UL data may be contained in one or more service data unit (SDUs), and the UL control information may be contained in one or more MAC CEs. The SDUs and MACs may form a PDU transmitted to the network device 110. Depending on the granted UL resources of the UL grant, there is a possibility that not all the UL data and the triggered UL control information can be transmitted using the current UL grant. The terminal device 120 performs prioritization across UL data in the LCHs and the UL control information.

Depending on the selected LCP setting, the generated PDU may include only UL control information, include UL control information and UL data of one or more LCHs with higher priority levels, and/or include only UL data of one or more LCHs with higher priority levels. Instead of using the same LCP setting for all the obtained UL grants, according to the example embodiments of the present disclosure, the terminal device 120 can flexibly select a first LCP setting and perform prioritization associated therewith for a first UL grant, and select a second LCP setting and perform different prioritization for a second UL grant. The terminal device 120 may transmit 240 the generated PDU to the network device 110 using the UL resources granted by the UL grant. For example, the PDU may be provided to the physical (PHY) layer for UL transmission.

Figure 3A:
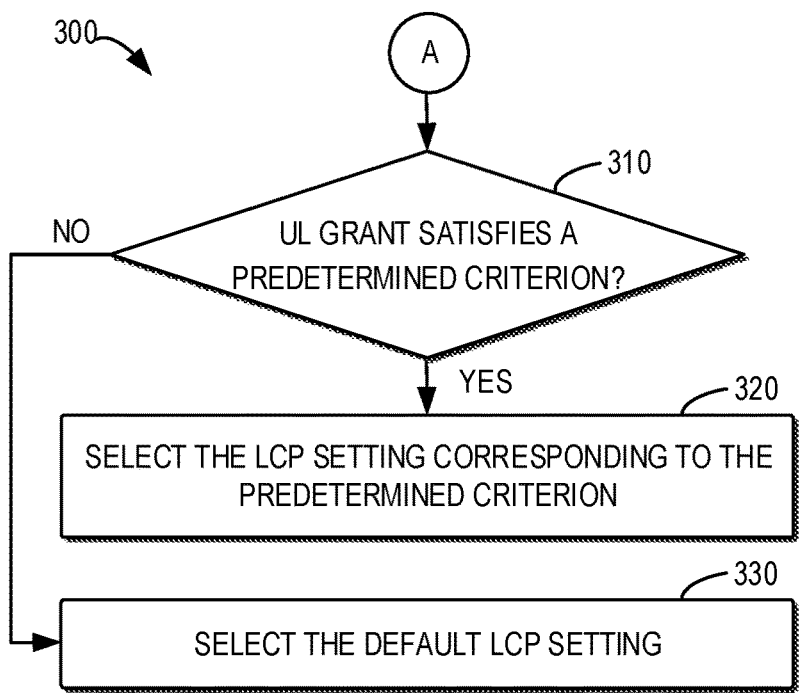
FIG. 3A and FIG. 3B illustrate flowcharts of example processes of selecting a logical channel prioritization setting by a terminal device according to some example embodiments of the present disclosure.

As mentioned above, the selection of the LCP setting for use may be determined by the terminal device 120 based on one or more characteristics of the UL grant. In some example embodiments, the selection of the LCP setting may be performed based on certain criteria associated with one or more LCP settings. FIG. 3A illustrates a flowchart of an example process 300 of selecting a LCP setting by the terminal device 120 according to some example embodiments.

As shown, at block 310, the terminal device 120 determines whether the currently obtained UL grant satisfies a predetermined criterion associated with a LCP setting. The predetermined criterion may be configured based on one or more characteristics of an UL grant. Thus, the terminal device 120 may identify the corresponding characteristics of the UL grant that is currently obtained and determine whether the characteristics of the current UL grant satisfy the predetermined criterion associated with one of the LCP settings. If the predetermined criterion is satisfied, at block 320, the terminal device 120 selects the LCP setting corresponding to this criterion. For example, among the example LCP settings provided in Table 1, the terminal device 120 may select the second LCP setting when its associated criterion is satisfied. In some example embodiments, the predetermined criterion associated with a LCP setting may be preconfigured by the network device 110. For example, the network device 110 may transmit a criterion indication that a predetermined criterion is associated with a LCP setting. The criterion indication may be transmitted, for example, via upper layer signaling such as RRC signaling.

In some example embodiments, the plurality of configured LCP settings may include a default LCP setting. If the UL grant fails to satisfy any predetermined criteria associated with other LCP settings than the default LCP setting, at block 330, the terminal device 120 decides to select the default LCP setting for the UL grant. In other words, the default LCP setting may not be associated with any predetermined criterion based on a characteristic of the UL grant, but can always be selected when no other criteria-based LCP settings can be selected. In an example, if the criterion associated with the second LCP setting is not satisfied and there is no other preconfigured LCP setting than the first default one as shown in Table 1, the terminal device 120 may select the default LCP setting.

According to the default LCP setting, the UL control information may be prioritized the UL data in the LCHs, such as illustrated in the first LCP setting in the above Table 1. In some example embodiments, as compared with the default LCP setting, the priority levels of some LCHs may be increased or even prioritize the UL control information in another LCP setting, such as the second LCP setting in the above Table 1. As such, if the current UL grant satisfies the predetermined criterion associated with the second LCP setting, the prioritization of those LCHs may be adaptively changed.

It would be appreciated that although two LCP settings (including the default one) are provided for selection in the example of FIG. 3A, there may be more other LCP settings provided for the terminal device 120. The terminal device 120 may determine sequentially or in parallel whether predetermined criteria associated with any one of the other LCP settings is satisfied so as to determine whether to select any of the LCP setting.

Any characteristics of the UL grant can be considered in selecting the LCP setting. In some example embodiments, one or more characteristics of the UL grant may affect or even decide the UL transmission performance, such as the delay, reliability, interference, and/or robustness. Respective thresholds for such characteristics may be measured in different LCP settings as the predetermined criteria. Some examples of the characteristics of the UL grant and the corresponding criteria will be discussed below.

In an example embodiment, the characteristic of the UL grant may include allocation of the granted UL resources in at least one of a time domain and a frequency domain. The allocation of the granted UL resources may include a duration of the UL resources in the time domain, the size of the UL resources, the number of physical resource blocks (PRBs), and/or the like. A LCP setting may be associated with a predetermined criterion based on the allocation of the granted UL resources, for example, by setting thresholds for the duration of UL resources, the size of UL resources, and/or the number of PRBs. If the allocation of the UL resources granted by the current UL grant satisfies the predetermined criterion, for example, the duration of the granted UL resource exceeds the threshold for the duration, the terminal device 120 may select the associated LCP setting. As such, the terminal device 120 may be switch between different LCP settings depending on the allocation of the granted UL resources.

As a specific example, the terminal device 120 may be configured with at least a first default LCP setting and a second LCP setting associated with a predetermine criterion based on a threshold for the duration of UL resources. If the duration of the UL resources granted by the current UL grant exceeds the threshold for the duration of the UL resources, the second LCP setting may be selected. A LCH, such as the LCH for URLLC data, may be set with a higher priority level and a LCP mapping restriction of the maximum duration in the default LCP setting and may be set with a lower priority level in the second LCP setting without the LCP mapping restriction of the maximum duration. Thus, the LCH with URLLC data may not be entirely excluded from the UL grant with the long duration. The PRB for the LCH with URLLC data may be decreased in the second LCP setting as compared with the default LCP setting. Therefore, according to the selected second LCP setting, if there is any spare UL resources of the current UL grant after allocated to the UL data and/or UL control information with relatively higher priority levels, the URLLC data in the specific LCH may still be transmitted using the current UL grant. In this way, if there is no suitable available UL grant in the near future, the terminal device 120 may also be able to transmit the URLLC data without waiting for another UL grant.

In an example embodiment, the characteristic of the UL grant may include a type of the UL grant. The type of UL grant may include a dynamic grant, a Type 1 Configured Grant, a Type 2 Configured Grant, and/or the like. One or more of the LCP settings may be associated with one or more specific types of UL grant. In this case, if the currently obtained UL grant has the same type associated with a LCP setting, the terminal device 120 may select the LCP setting to perform the prioritization in generating the PDU.

In an example embodiment, the characteristic of the UL grant may include a spectrum where the UL resources are located. The spectrum may include a licensed spectrum or an unlicensed spectrum. Generally, the unlicensed spectrum may suffer from more uncontrollable interferences other wireless communication systems, such as IEEE 802.11, and may have a higher probability of being delayed by potential failure in listen-before-talk (LBT) procedures. Thus, in a LCP setting associated with an unlicensed spectrum, the LCH with a low latency requirement and/or a high reliability requirement, such as a LCH for URLLC data, may be set with a lower priority level. Thus, the URLLC data may has a lower probability of being transmitted using the UL resources on the unlicensed spectrum.

Alternatively, or in addition, the characteristics of the UL grant may include whether the UL resources are allocated on a supplementary UL (SUL), and/or whether frequency hopping of the UL resources is enabled. The UL transmission performance may depend on these two aspects of the UL resources, including the performance related to latency and reliability. Different LCP settings may be associated with criteria of having the UL resources allowed on the SUL and/or enabling frequency hopping on the UL resources. In some examples, in a LCP setting associated with the SUL and/or frequency hopping, the LCH with a low latency requirement and/or a high reliability requirement may be set with a lower priority level.

Some examples of characteristics of the UL grant may also include a waveform type of the UL resources, such as OFDM, CP-OFDM, DFT-s-OFDM, and/or the like; a numerology for the UL resources (corresponding to a sub-carrier spacing), a modulation coding scheme (MCS) for the UL resources, a transport block size (TBS) for the UL resources, and/or a transmission power for the UL resources. The configurations of these characteristics may also affect the UL transmission performance, including the performance related to latency and reliability.

As an example, a LCP setting may be selected when the predetermined criterion of the TBS being lower than a threshold is satisfied. According to this LCP setting, the priority level of the LCH with a low latency requirement (such as the LCH having URLLC data) may be set with a higher priority level or even prioritize the UL control information. As compared with the default LCP setting where the UL control information prioritizes all the LCHs, the URLLC data can be allocated with the UL resource first and may not be segmented and delayed due to the small TBS and the prioritization of the UL control information.

In another example, a LCP setting may be selected when the predetermined criterion of the MCS meeting a reliability threshold is satisfied. According to this LCP setting, the priority level of the LCH with a high reliability requirement may be set with a lower priority level as it is less desirable to transmit UL data with more strict error targets with the MCS that is more prone to erroneous transmission. This LCP setting is more applicable to UL data that are not so delay-sensitive but with very high reliability requirement. Of course, it would be appreciated that the predetermined criterion may be based on both the TBS and MCS so as to meet the requirements on both latency and reliability, which is applicable to UL data that requires low latency and high reliability at the same time, such as URLLC data.

In some example embodiments, the characteristics of the UL grant may also include a setting for MIMO in the UL resources, a setting for Hybrid Automatic Repeat Request (HARM) in the UL resources, a multiple-access scheme configured for the UL resources, whether a repetition in the UL resources is enabled, and/or the number of repetitions configured for transmission in the UL resources. The setting for MIMO may include, for example, a setting of a single rank or multi-rank, the antenna port(s) of the terminal device 120 used for UL transmission, a configuration on the pre-coder codebook, and/or the like. The setting for HARQ may include, for example, various types of HARQ timer. The multiple-access scheme may include, for example, an orthogonal multi-access (OMA) scheme or a non-orthogonal multi-access (NOMA) scheme. Different LCP settings may depend on different settings for MIMO, HARQ, and/or the multiple-access scheme, based on whether a repetition in the uplink resources is enabled (the number of repetition is greater than one), and/or whether the number of repetitions is greater than a threshold (larger than one). These criteria may be related on different reliability levels, interference levels, latency levels, and/or the like.

For example, it is less desirable to transmit UL data with a higher reliability requirement using the UL resources configured with a multi-rank MIMO scheme due to potential interferences between spatial streams. Thus, the LCP setting associated with the multi-rank MIMO scheme may define a lower priority level for the LCH with the higher reliability requirement. As another example, UL transmission using the UL resources with the NOMA scheme may also result in lower reliability and thus the LCP setting associated with the NOMA scheme may also define a lower priority level for the LCH with the higher reliability requirement. As a further example, it is less desirable to use additional radio resources for UL data that are already privileged in PDCP-level duplicated transmission. Thus, in the LCP setting associated with the criteria that the repetition on the UL resources is enabled (for example, the number of the repetitions is larger than one) or the repetition level is higher than a threshold (for example, the number of the repetitions is larger than two or more), the priority level of a LCH for PDCP duplication may be set with a lower level, and/or the PBR may be set as a lower value.

In some example embodiments, the characteristics of the UL grant may also include whether the UL resources granted by the current UL grant collide with other available UL resources (for example, overlap with other UL resources in the time and/or frequency domain). The collision between other UL resources (which may be granted by a further UL grant) may increase the latency of the UL data transmission. Thus, different LCP settings may be configured to be associated with the cases whether the collision occurs or not. In some examples, the LCP settings may be associated with the specific information of the colliding UL resources if the information transmitted on the colliding UL resources is already known. For example, if some UL data with a higher priority level (such as the UL data with a low latency requirement) is known to be transmitted on the colliding UL resources, for the current UL grant, the terminal device 120 may select the LCP setting with a higher priority level for a LCH without restrict latency requirement (such as enhanced Mobile Broadband (eMBB) data) and a lower priority for a LCH with a low latency requirement (such as URLLC data). As such, it is possible to avoid or eliminate the probability that UL data of two LCHs with the low latency requirement delay each other due to resource collision.

In some example embodiments, the characteristics of the UL grant may also include a timing relationship between the UL grant and a further UL grant that is expected in a future period of time. The timing relationship is taken into account when it is known that one or more up-coming UL grants can better satisfy the requirement(s) of UL data in a LCH. In this case, the LCP setting defining a lower priority level and/or a lower PBR for the corresponding LCH may be selected for the current UL grant.

In a further example embodiment, the characteristics of the UL grant may include an interval between a time when the UL grant is obtained and a time when transmission on the UL grant starts. For example, if the interval is larger than a threshold, which means that there is a long time before the UL transmission using the current UL grant actually starts. In this case, the LCP setting associated with a longer interval may define a lower priority level for the LCH with a low latency requirement.

Some examples of the characteristic of the UL grant considered in the predetermined criteria for the LCP settings have been described above. When selecting the LCP setting for the currently obtained UL grant, the terminal device 120 may determine whether the corresponding characteristic(s) of this UL grant meets any of the predetermined criteria and thus select the LCP setting with the criterion satisfied. It would be appreciated that the predetermined criterion associated with a LCP setting may be configured to be associated with one or more of the above characteristics and other characteristics.

In some example embodiments, as an alternative or in addition to the characteristic(s) of the UL grant, the terminal device 120 may determine the LCP setting further based on a buffer status of one or more of the LCHs. In some examples, the predetermined criterion associated with a LCP setting may be based on a buffer status of one or more of the LCHs, for example, by setting a threshold for a buffer status of each of the LCHs. The terminal device 120 may accordingly select the LCP setting for use based on the current buffer status of the corresponding LCHs. For example, a LCP setting may be selected if the buffer status of a specific LCH is higher than a threshold and the duration of the granted UL resources exceeds a threshold. Thus, when the current buffer status of that LCH is lower than the corresponding threshold, the terminal device 120 may not select that LCP setting but turn to select the default LCP setting.

In some example embodiments, there may be more than one UL grant available at the terminal device 120. The terminal device 120 may jointly consider the characteristics of these UL grants to determine how LCP settings can be selected for each of the UL grants. In some examples, the jointly considered UL grants may have a gap between the transmission starting times lower than a threshold. That is, the UL grants corresponding to close transmission times are jointly considered when selecting the UL grant. In this case, the LCP setting used for a certain UL grant may depend on the characteristic of a further UL gran.

Figure 3B:
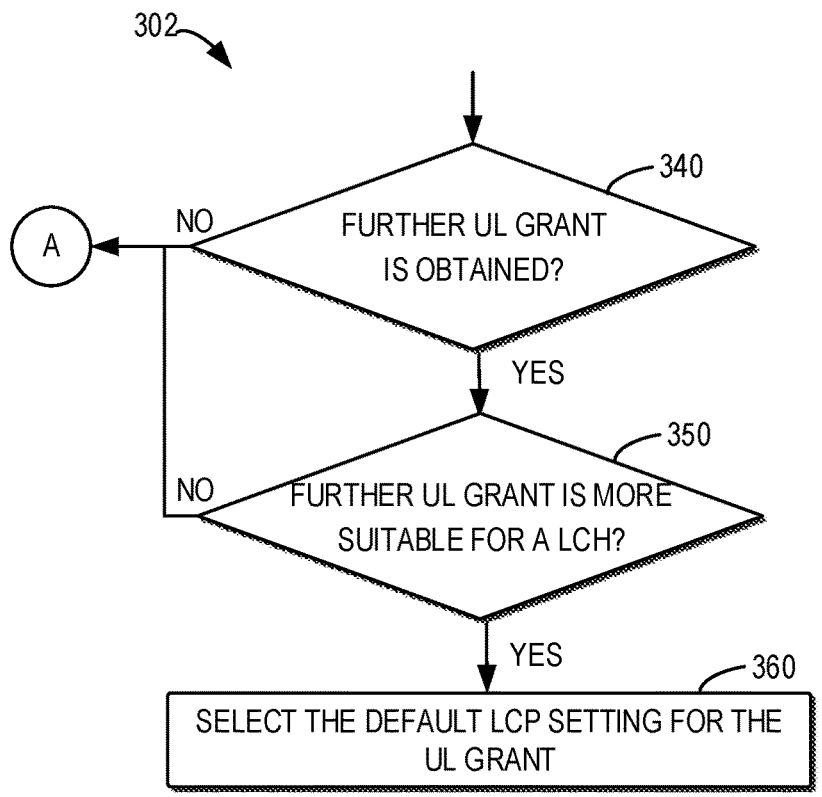

FIG. 3B shows a flowchart of an example process 302 of selecting a LCP setting by the terminal device 120 according to some example embodiments. In order to select a LCP setting for the current UL grant in concern, at block 340, the terminal device 120 determines if there is a further UL grant obtained from the network device 110. If there is such a UL grant, at block 350, the terminal device 120 may further determine whether the further UL grant is more suitable for transmission of UL data in one or more LCHs, for example, based on one or more characteristics of this further UL grant.

Still using the example LCP settings in Table 1 as an example. If the terminal device 120 determines, based on the characteristic of the current UL grant, that the second LCP setting in Table 1 can be selected for the current UL grant in order to serve UL data in a certain LCH, the terminal device 120 may further identify, based on the characteristics of the further available UL grant, that the further UL grant is more suitable in transmission of the UL data in that LCH. In this case, the terminal device 120 may not select the second LCP setting but another LCP setting. For example, in the example process 302, the terminal device 120 selects, at block 360, the first default LCP setting in Table 1 for the current UL grant.

It would be appreciated that the terminal device 120 may select a different LCP setting instead of the default one when it finds that the further UL grant is more suitable for one or more LCHs than the current UL grant. The principle is to make sure that the LCP setting selected for the current UL grant defines a lower priority level and/or lower PBRs for the LCH(s) that can be transmitted in a better way using the further UL grant. In this case, by jointly considering available UL grants at the terminal device, it is possible to further improve the overall performance in UL transmission.

If no further UL grant is available or if the further UL grant is not more suitable for one or more LCHs, the terminal device 120 may turn to select the LCP setting for the current UL grant based on the characteristic(s) of the current UL grant and/or the buffer status of the LCH(s), for example, turn to perform the process 300 as shown in FIG. 3A.

In some example embodiments, the adaptation behavior of the terminal device 120 among the plurality of LCP settings may be dynamically enabled and/or disabled by the network device 110. The terminal device 120 may determine whether adaptation among the plurality of LCP settings is enabled for the UL grant, and select a LCP setting based on the characteristic(s) of the current UL grant and/or the buffer status of the LCH(s) when the adaptation is enabled. In the case where the adaptation is disabled for the UL grant, the terminal device 120 may always select the same LCP setting such as the default LCP setting for the obtained UL grant.

Figure 4:
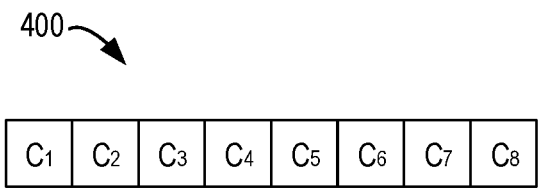
FIG. 4 illustrates a schematic diagram of an example of structure of a downlink (DL) Medium Access Control (MAC) Control Element (CE)

In some example embodiments, the enabling/disabling of the adaptation may be carried out at a "per-grant" manner, for example, via control signaling such as in a MAC CE in DL. For example, when there are possibly multiple active UL grants for the terminal device 120, the network device 110 may transmit an indication indicating whether the terminal device 120 can perform the adaption of LCP settings for each of the UL grants. FIG. 4 shows an example of structure of a DL MAC CE 400 that can be used to enable/disable the adaptation among the LCP settings. In the example of FIG. 3, it is supposed that there is up to eight active UL grants for the terminal device 120. The DL MAC CE 400 includes eight bits corresponding to the eight configured UL grants, respectively, each bit C, indicating whether the adaptation is enabled or disabled for the corresponding UL grant through a value of 0 or 1. It would be appreciated that if the maximum number of active UL grants is lower or higher than eight, the DL MAC CE may be adapted accordingly to indicate the LCP settings for those UL grants.

In some example embodiments, as mentioned above, instead of determining the LCP setting for use by the terminal device 120 itself, the network device 110 may directly instruct which one of the plurality of LCP settings can be used for the UL grant. In these example embodiments, the network device 110 may transmit 215 to the terminal device 120 a setting indication, as can be seen from FIG. 2. The setting indication may indicate to the terminal device 120 that one of the plurality of LCP settings is to be applied for the UL grant. In some example embodiments, the setting indication may be transmitted in a DL control information (DCI) format for a scheduling grant. In some example embodiments, for a configured UL grant, the setting indication may be embedded in the RRC configuration (for example, for Type 1 Configured Grant) or in the DCI (for example, for activation of Type 2 Configured Grant). The terminal device 120, upon receipt of the setting indication, may select the indicated LCP setting for the current UL grant.

In some example embodiments, it is possible to configure, for example via RRC signalling, the terminal device 120 to either perform the adaption among all the selectable LCP settings itself or based on a direct indication from the network device 110. That is, the network device 110 is able to explicitly or implicitly instruct switching between these two type of adaptation behaviours (for example, the absence of the criteria triggering the conditional LCP setting in the RRC signalling would imply that the terminal device 120 should only select the LCP setting based on the network device's indication).

Figure 5:
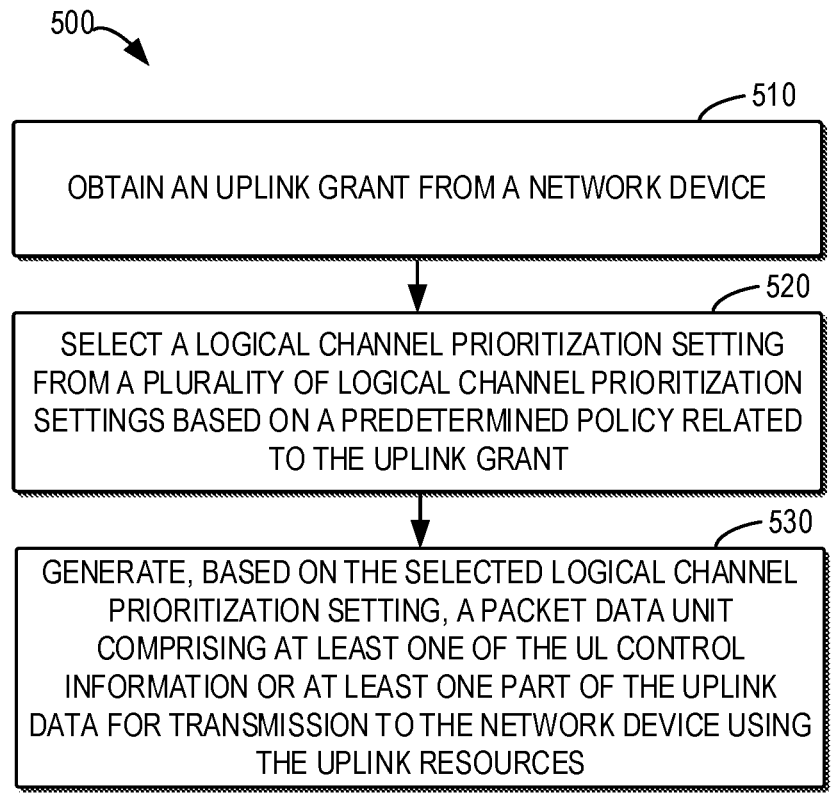
FIG. 5 illustrates a flowchart of a method implemented at a terminal device according to some example embodiments of the present disclosure.

FIG. 5 shows a flowchart of an example method 500 implemented at a terminal device according to some example embodiments of the present disclosure. For the purpose of discussion, the method 500 will be described from the perspective of the terminal device 120 with reference to FIG. 1.

At block 510, the terminal device 120 obtains an uplink grant from a network device, the uplink grant indicating uplink resources for transmission to the network device. At block 520, the terminal device 120 selects a logical channel prioritization setting from a plurality of logical channel prioritization settings based on a predetermined policy related to the uplink grant. The plurality of logical channel prioritization settings define different sets of prioritization parameters for uplink data in at least one logical channel and uplink control information in occupying the uplink resources. At block 530, the terminal device 120 generates, based on the selected logical channel prioritization setting, a packet data unit comprising at least one of the uplink control information or at least one part of the uplink data for transmission to the network device using the uplink resources.

In some example embodiments, the selecting comprises: selecting a logical channel prioritization setting from the plurality of logical channel prioritization settings based on a setting indication associated with the uplink grant and received from the network device, the setting indication indicating one of the plurality of logical channel prioritization settings to be applied for the uplink grant.

In some example embodiments, the selecting comprises determining a logical channel prioritization setting from the plurality of logical channel prioritization settings based at least in part on a characteristic of the uplink grant.

In some example embodiments, the determining comprises determining, based at least in part on the characteristic of the uplink grant, whether the uplink grant satisfies a predetermined criterion associated with one of the plurality of logical channel prioritization settings; in response to determining that the uplink grant satisfies the predetermined criterion, selecting the logical channel prioritization setting corresponding to the predetermined criterion; and in response to determining that the uplink grant fails to satisfy predetermined criteria associated with other logical channel prioritization settings than a default logical channel prioritization setting in the plurality of logical channel prioritization settings, selecting the default logical channel prioritization setting for the uplink grant.

In some example embodiments, the determining further comprises: determining a logical channel prioritization setting from the plurality of logical channel prioritization settings further based on a buffer status of the at least one logical channel.

In some example embodiments, the characteristic of the uplink grant comprises at least one of the following: allocation of the uplink resources in at least one of a time domain and a frequency domain, a type of the uplink grant, a spectrum where the uplink resources are located, whether the uplink resources are allocated on a supplementary uplink, whether frequency hopping of the uplink resources is enabled, a waveform type of the uplink resources, a numerology for the uplink resources, a modulation coding scheme for the uplink resources, a transport block size for the uplink resources, a transmission power for the uplink resources, a setting for Multi-Input Multi-Output in the uplink resources, a setting for Hybrid Automatic Repeat Request in the uplink resources, whether the uplink resources collide with other available uplink resources, a timing relationship between the uplink grant and a further uplink grant that is expected in a future period of time, an interval between a time when the uplink grant is obtained and a time when transmission on the uplink grant starts, whether a repetition in the uplink resources is enabled, the number of repetitions in the uplink resources, and a multiple-access scheme configured for the uplink resources.

In some example embodiments, the method 500 further comprises receiving, from the network device, a criterion indication that a predetermined criterion is associated with a logical channel prioritization setting.

In some example embodiments, the determining based at least in part on the characteristic of the uplink grant comprises determining whether adaptation among the plurality of logical channel prioritization settings is enabled for the uplink grant; and in response to determining that the adaptation is enabled for the uplink grant, determining a logical channel prioritization setting from the plurality of logical channel prioritization settings based at least in part on the characteristic of the uplink grant.

In some example embodiments, the selecting further comprises: in response to determining that the adaptation is disabled for the uplink grant, selecting a default logical channel prioritization setting for the uplink grant from the plurality of logical channel prioritization settings.

In some example embodiments, the selecting comprises: determining whether a further uplink grant is obtained from the network device; and in response to the further uplink grant, determining the logical channel prioritization setting for the uplink grant further based on a characteristic of the further uplink grant.

In some example embodiments, the method 500 further comprises receiving, from the network device, a configuration of the plurality of logical channel prioritization settings.

In some example embodiments, the selecting comprises: determining whether adaptation among the plurality of logical channel prioritization settings is enabled for the uplink grant; and in response to determining that the adaptation is enabled, selecting the logical channel prioritization setting from the plurality of logical channel prioritization settings for the uplink grant.

In some example embodiments, the set of prioritization parameters defined by a logical channel prioritization setting comprises at least one of the following: relative prioritization between the uplink control information and the uplink data in the at least one logical channel, a priority level of the at least one logical channel, a prioritized bit rate for the at least one logical channel, a bucket size duration for the at least one logical channel, and a logical channel mapping restriction on the at least one logical channel.

Figure 6:
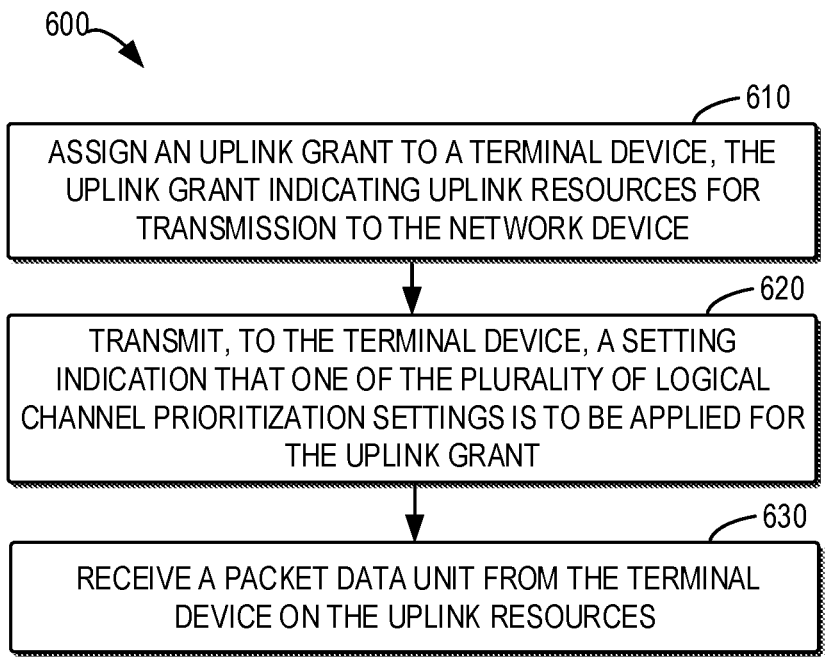
FIG. 6 illustrates a flowchart of a method implemented at a network device according to some example embodiments of the present disclosure.

FIG. 6 shows a flowchart of an example method 600 implemented at a network device according to some example embodiments of the present disclosure. For the purpose of discussion, the method 600 will be described from the perspective of the network device 110 with reference to FIG. 1.

At block 610, the network device 110 assigns an uplink grant to a terminal device, the uplink grant indicating uplink resources for transmission to the network device. At block 620, the network device 110 transmits, to the terminal device, a setting indication that one of the plurality of logical channel prioritization settings is to be applied for the uplink grant. The plurality of logical channel prioritization settings defining different sets of prioritization parameters for uplink data in at least one logical channel and uplink control information in occupying the uplink resources. At block 630, the network device 110 receives a packet data unit from the terminal device on the uplink resources. The packet data unit comprises at least one of the uplink control information or at least one part of the data, and is generated based on the logical channel prioritization setting indicated by the setting indication.

In some example embodiments, the set of prioritization parameters defined by a logical channel prioritization setting comprises at least one of the following: relative prioritization between the uplink control information and the uplink data in the at least one logical channel, a priority level of the at least one logical channel, a prioritized bit rate for the at least one logical channel, a bucket size duration for the at least one logical channel, and a logical channel mapping restriction on the at least one logical channel.

In some example embodiments, the method 600 further comprises transmitting, to the terminal device, a configuration of the plurality of logical channel prioritization settings.

In some example embodiments, an apparatus capable of performing any of the method 500 (for example, the terminal device 120) may comprise means for performing the respective steps of the method 500. The means may be implemented in any suitable form. For example, the means may be implemented in a circuitry or software module.

In some example embodiments, the apparatus comprises means for obtaining, at a terminal device, an uplink grant from a network device, the uplink grant indicating uplink resources for transmission to the network device; means for selecting a logical channel prioritization setting from a plurality of logical channel prioritization settings based on a predetermined policy related to the uplink grant, the plurality of logical channel prioritization settings defining different sets of prioritization parameters for uplink data in at least one logical channel and uplink control information in occupying the uplink resources; and means for generating, based on the selected logical channel prioritization setting, a packet data unit comprising at least one of the uplink control information or at least one part of the uplink data for transmission to the network device using the uplink resources.

In some example embodiments, the means for selecting comprises: means for receiving, from the network device, a setting indication that one of the plurality of logical channel prioritization settings is to be applied for the uplink grant; and means for in response to the setting indication, selecting the logical channel prioritization setting for the uplink grant.

In some example embodiments, the means for selecting comprises means for selecting a logical channel prioritization setting from the plurality of logical channel prioritization settings based on a setting indication associated with the uplink grant and received from the network device, the setting indication indicating one of the plurality of logical channel prioritization settings to be applied for the uplink grant.

In some example embodiments, the means for selecting comprises means for determining a logical channel prioritization setting from the plurality of logical channel prioritization settings based at least in part on a characteristic of the uplink grant.

In some example embodiments, the means for determining comprises means for determining, based at least in part on the characteristic of the uplink grant, whether the uplink grant satisfies a predetermined criterion associated with one of the plurality of logical channel prioritization settings; means for in response to determining that the uplink grant satisfies the predetermined criterion, selecting the logical channel prioritization setting corresponding to the predetermined criterion; and means for in response to determining that the uplink grant fails to satisfy predetermined criteria associated with other logical channel prioritization settings than a default logical channel prioritization setting in the plurality of logical channel prioritization settings, selecting the default logical channel prioritization setting for the uplink grant.

In some example embodiments, the means for determining further comprises means for determining a logical channel prioritization setting from the plurality of logical channel prioritization settings further based on a buffer status of the at least one logical channel.

In some example embodiments, the characteristic of the uplink grant comprises at least one of the following: allocation of the uplink resources in at least one of a time domain and a frequency domain, a type of the uplink grant, a spectrum where the uplink resources are located, whether the uplink resources are allocated on a supplementary uplink, whether frequency hopping of the uplink resources is enabled, a waveform type of the uplink resources, a numerology for the uplink resources, a modulation coding scheme for the uplink resources, a transport block size for the uplink resources, a transmission power for the uplink resources, a setting for Multi-Input Multi-Output in the uplink resources, a setting for Hybrid Automatic Repeat Request in the uplink resources, whether the uplink resources collide with other available uplink resources, a timing relationship between the uplink grant and a further uplink grant that is expected in a future period of time, an interval between a time when the uplink grant is obtained and a time when transmission on the uplink grant starts, whether a repetition in the uplink resources is enabled, the number of repetitions in the uplink resources, and a multiple-access scheme configured for the uplink resources.

In some example embodiments, the apparatus further comprises means for receiving, from the network device, a criterion indication that a predetermined criterion is associated with a logical channel prioritization setting.

In some example embodiments, the means for determining comprises: means for determining whether adaptation among the plurality of logical channel prioritization settings is enabled for the uplink grant; and means for in response to determining that the adaptation is enabled for the uplink grant, determining a logical channel prioritization setting from the plurality of logical channel prioritization settings based at least in part on the characteristic of the uplink grant.

In some example embodiments, the means for selecting further comprises means for in response to determining that the adaptation is disabled for the uplink grant, selecting a default logical channel prioritization setting for the uplink grant from the plurality of logical channel prioritization settings.

In some example embodiments, the means for determining further comprises: means for determining whether a further uplink grant is obtained from the network device; and means for in response to the further uplink grant, determining the logical channel prioritization setting for the uplink grant further based on a characteristic of the further uplink grant.

In some example embodiments, the apparatus further comprises means for receiving, from the network device, a configuration of the plurality of logical channel prioritization settings.

In some example embodiments, the set of prioritization parameters defined by a logical channel prioritization setting comprises at least one of the following: relative prioritization between the uplink control information and the uplink data in the at least one logical channel, a priority level of the at least one logical channel, a prioritized bit rate for the at least one logical channel, a bucket size duration for the at least one logical channel, and a logical channel mapping restriction on the at least one logical channel.

In some example embodiments, the means in the apparatus comprises at least one processor; and at least one memory including computer program code, the at least one memory and computer program code configured to, with the at least one processor, cause the performance of the apparatus.

In some example embodiments, an apparatus capable of performing any of the method 600 (for example, the network device 110) may comprise means for performing the respective steps of the method 600. The means may be implemented in any suitable form. For example, the means may be implemented in a circuitry or software module.

In some example embodiments, the apparatus comprises: means for assigning, by a network device, an uplink grant to a terminal device, the uplink grant indicating uplink resources for transmission to the network device; means for transmitting, to the terminal device, a setting indication that one of the plurality of logical channel prioritization settings is to be applied for the uplink grant, the plurality of logical channel prioritization settings defining different sets of prioritization parameters for uplink data in at least one logical channel and uplink control information in occupying the uplink resources; and means for receiving a packet data unit from the terminal device on the uplink resources, the packet data unit comprising at least one of the uplink control information or at least one part of the data, and the packet data unit being generated based on the logical channel prioritization setting indicated by the setting indication.

In some example embodiments, the set of prioritization parameters defined by a logical channel prioritization setting comprises at least one of the following: relative prioritization between the uplink control information and the uplink data in the at least one logical channel, a priority level of the at least one logical channel, a prioritized bit rate for the at least one logical channel, a bucket size duration for the at least one logical channel, and a logical channel mapping restriction on the at least one logical channel.

In some example embodiments, the apparatus further comprises means for transmitting, to the terminal device, a configuration of the plurality of logical channel prioritization settings.

In some example embodiments, the means in the apparatus comprises at least one processor; and at least one memory including computer program code, the at least one memory and computer program code configured to, with the at least one processor, cause the performance of the apparatus.

Figure 7:
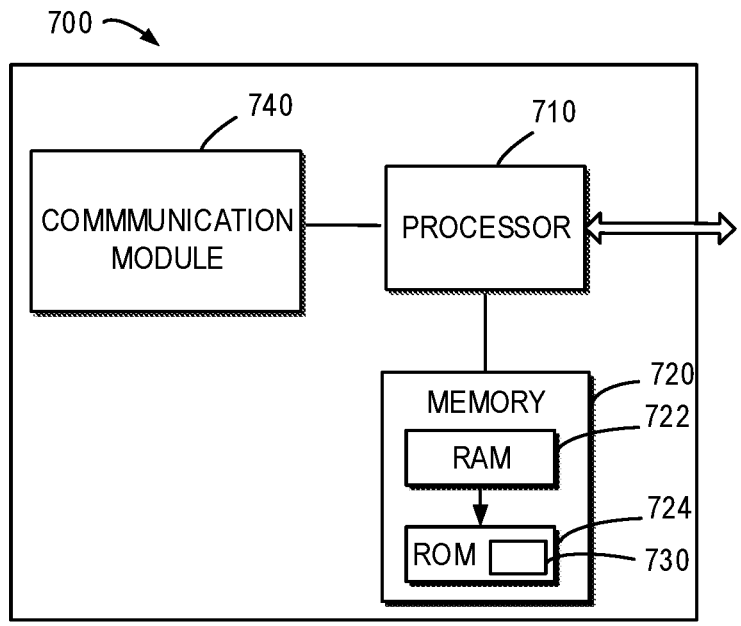
FIG. 7 illustrates a simplified block diagram of an apparatus that is suitable for implementing example embodiments of the present disclosure.

FIG. 7 is a simplified block diagram of a device 700 that is suitable for implementing embodiments of the present disclosure. The device 700 may be provided to implement a communication device, for example the terminal device 120 or the network device 110 as shown in FIG. 1. As shown, the device 700 includes one or more processors 710, one or more memories 740 coupled to the processor 710, and one or more transmitters and/or receivers (TX/RX) 740 coupled to the processor 710.

The TX/RX 740 is for bidirectional communications. The TX/RX 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 720. The processor 710 may perform any suitable actions and processing by loading the program 730 into the RAM 720.

The example embodiments of the present disclosure may be implemented by means of the program 730 so that the device 700 may perform any process of the present disclosure as discussed with reference to FIG. 2, FIG. 3A, FIG. 3B, FIG. 5, and FIG. 6. The example embodiments of the present disclosure may also be implemented by hardware or by a combination of software and hardware.

Figure 8:
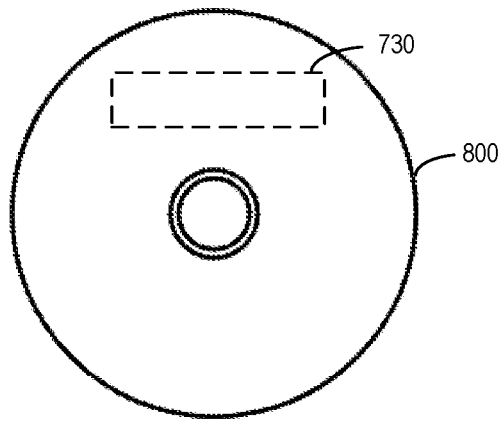
FIG. 8 illustrates a block diagram of an example computer readable medium according to some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods/processes as described above with reference to FIG. 2, FIG. 3A, FIG. 3B, FIG. 5, and FIG. 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, comprising:
   obtaining, at a terminal device, an uplink grant from a network device, the uplink grant indicating uplink resources for transmission to the network device;
   selecting a logical channel prioritization setting from a plurality of logical channel prioritization settings based on a predetermined policy related to the uplink grant, the plurality of logical channel prioritization settings defining different sets of prioritization parameters for uplink data in at least one logical channel and uplink control information in occupying the uplink resources; and generating, based on the selected logical channel prioritization setting, a packet data unit comprising at least one of the uplink control information or at least one part of the uplink data for transmission to the network device using the uplink resources, wherein the method further comprises:

selecting a logical channel prioritization setting from the plurality of logical channel prioritization settings based on a setting indication associated with the uplink grant and received from the network device, the setting indication indicating one of the plurality of logical channel prioritization settings to be applied for the uplink grant.

2. A device, comprising:

at least one processor; and at least one non-transitory memory including computer program codes;

the at least one memory and the computer program codes are configured to, with the at least one processor, cause the device to:

obtain, at a terminal device, an uplink grant from a network device, the uplink grant indicating uplink resources for transmission to the network device, select a logical channel prioritization setting from a plurality of logical channel prioritization settings based on a predetermined policy related to the uplink grant, the plurality of logical channel prioritization settings defining different sets of prioritization parameters for uplink data in at least one logical channel and uplink control information in occupying the uplink resources, and generate, based on the selected logical channel prioritization setting, a packet data unit comprising at least one of the uplink control information or at least one part of the uplink data for transmission to the network device using the uplink resources, wherein the at least one memory and the computer program codes are configured, with the at least one processor, to cause the device to:

select a logical channel prioritization setting from the plurality of logical channel prioritization settings based on a setting indication associated with the uplink grant and received from the network device, the setting indication indicating one of the plurality of logical channel prioritization settings to be applied for the uplink grant.

3. The device of claim 2, wherein the at least one memory and the computer program codes are configured, with the at least one processor, to cause the device to:

determine a logical channel prioritization setting from the plurality of logical channel prioritization settings based at least in part on a characteristic of the uplink grant.

4. The device of claim 3, wherein the at least one memory and the computer program codes are configured, with the at least one processor, to cause the device to:

determine, based at least in part on the characteristic of the uplink grant, whether the uplink grant satisfies a predetermined criterion associated with one of the plurality of logical channel prioritization settings;

in response to determining that the uplink grant satisfies the predetermined criterion, select the logical channel prioritization setting corresponding to the predetermined criterion; and in response to determining that the uplink grant fails to satisfy predetermined criteria associated with other logical channel prioritization settings than a default logical charnel prioritization setting in the plurality of logical channel prioritization settings, select the default logical channel prioritization setting for the uplink grant.

5. The device of claim 3, wherein the at least one memory and the computer program codes are configured, with the at least one processor, to cause the device to:

determining a logical channel prioritization setting from the plurality of logical channel prioritization settings further based on a buffer status of the at least one logical channel.

6. The device of claim 3, wherein the characteristic of the uplink grant comprises at least one of the following:

allocation of the uplink resources in at least one of a time domain or a frequency domain, a type of the uplink grant, a spectrum where the uplink resources are located, whether the uplink resources are allocated on a supplementary uplink, whether frequency hopping of the uplink resources is enabled, a waveform type of the uplink resources, a numerology for the uplink resources, a modulation coding scheme for the uplink resources, a transport block size for the uplink resources, a transmission power for the uplink resources, a setting for Multi-Input Multi-Output in the uplink resources, a setting for Hybrid Automatic Repeat Request in the uplink resources, whether the uplink resources collide with other available uplink resources, a timing relationship between the uplink grant and a further uplink grant that is expected in a future period of time, an interval between a time when the uplink grant is obtained and a time when transmission on the uplink grant starts, whether a repetition in the uplink resources is enabled, the number of repetitions in the uplink resources, or a multiple access scheme configured for the uplink resources.

7. The device of claim 3, wherein the at least one memory and the computer program codes are configured, with the at least one processor, to cause the device to:

determine whether adaptation among the plurality of logical channel prioritization settings is enabled for the uplink grant; and in response to determining that the adaptation is enabled for the uplink grant, determine a logical channel prioritization setting from the plurality of logical channel prioritization settings based at least in part on the characteristic of the uplink grant.

8. The device of claim 3, wherein at least one memory and the computer program codes are configured, with the at least one processor, to cause the device to:

determine whether a further uplink grant is obtained from the network device; and in response to the further uplink grant, select the logical channel prioritization setting for the uplink grant based on a characteristic of the further uplink grant.

9. The device of claim 8, wherein the at least one memory and the computer program codes are configured, with the at least one processor, to cause the device to:

in response to determining that the adaptation is disabled for the uplink grant, select a default logical channel prioritization setting for the uplink grant from the plurality of logical channel prioritization settings.

10. The device of claim 3, wherein the at least one memory and the computer program codes are configured, with the at least one processor, to cause the device to:
determine whether a further uplink grant is obtained from the network device; and
in response to the further uplink grant, determine the logical channel prioritization setting for the uplink grant further based on a characteristic of the further uplink grant.

11. The device of claim 2, wherein the at least one memory and the computer program codes are configured, with the at least one processor, to cause the device to:
receive, from the network device, a configuration of the plurality of logical channel prioritization settings.

12. The device of claim 2, wherein the set of prioritization parameters defined by a logical channel prioritization setting comprises at least one of the following:
relative prioritization between the uplink control information and the uplink data in the at least one logical channel,
a priority level of the at least one logical channel,
a prioritized bit rate for the at least one logical channel,
a bucket size duration for the at least one logical channel, or
a logical channel mapping restriction on the at least one logical channel.

13. A device, comprising:
at least one processor; and
at least one non-transitory memory including computer program codes;
the at least one memory and the computer program codes are configured to, with the at least one processor, cause the device to:
assign, by a network device, an uplink grant to a terminal device, the uplink grant indicating uplink resources for transmission to the network device,
transmit, to the terminal device, a setting indication that one of the plurality of logical channel prioritization settings is to be applied for the uplink grant, the plurality of logical channel prioritization settings defining different sets of prioritization parameters for uplink data in at least one logical channel and uplink control information in occupying the uplink resources, and
receive a packet data unit from the terminal device on the uplink resources, the packet data unit comprising at least one of the uplink control information or at least one part of the data, and the packet data unit being generated based on the logical channel prioritization setting indicated by the setting indication,
wherein the at least one memory and the computer program codes are configured, with the at least one processor, to cause the device to:
transmit, to the terminal device, a configuration of the plurality of logical channel prioritization settings.

* * * * *